Inventor
Eugene C. Bernheim
by David Rines
Attorney

Patented Apr. 9, 1929.

1,708,207

UNITED STATES PATENT OFFICE.

EUGENE CLAYTON BERNHEIM, OF SOUTHBRIDGE, MASSACHUSETTS, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed March 21, 1923. Serial No. 626,542.

The present invention relates to ophthalmic mountings, and more particularly to fingerpiece eyeglass mountings of the type in which the lens rims are split at the point of juncture with the bridge.

When such a mounting, as at present constructed, becomes broken in any part, it is usually necessary to discard the whole mounting. If one of the rims or the bridge, for example, becomes damaged, or if the style changes from one type or shape of rim or bridge to another, the whole mounting must be thrown away.

An object of the present invention is to form the rim of a fingerpiece mounting of the above-described character separate from the bridge. The damaged or unstylish part may then be readily replaced by a like new part. The optician is, furthermore, permitted to keep a smaller stock on hand, since all that he needs to have is an assortment of different-style bridges, that may be connected to any desired type of rims. According to the preferred embodiment of the invention that is illustrated and described herein, the bridge is provided with an end piece that is superposed on the end pieces of the rim, the bridge and the rim being secured together at the end pieces. This construction renders it possible to mount the customary spring-pressed, fingerpiece guard upon the bridge end piece, so as to render it removable as a unit with the bridge from the rim.

Other objects of the invention will be made clear in the course of the following description, taken in connection with the accompanying drawings, and will be defined in the accompanying claims.

Figure 1:
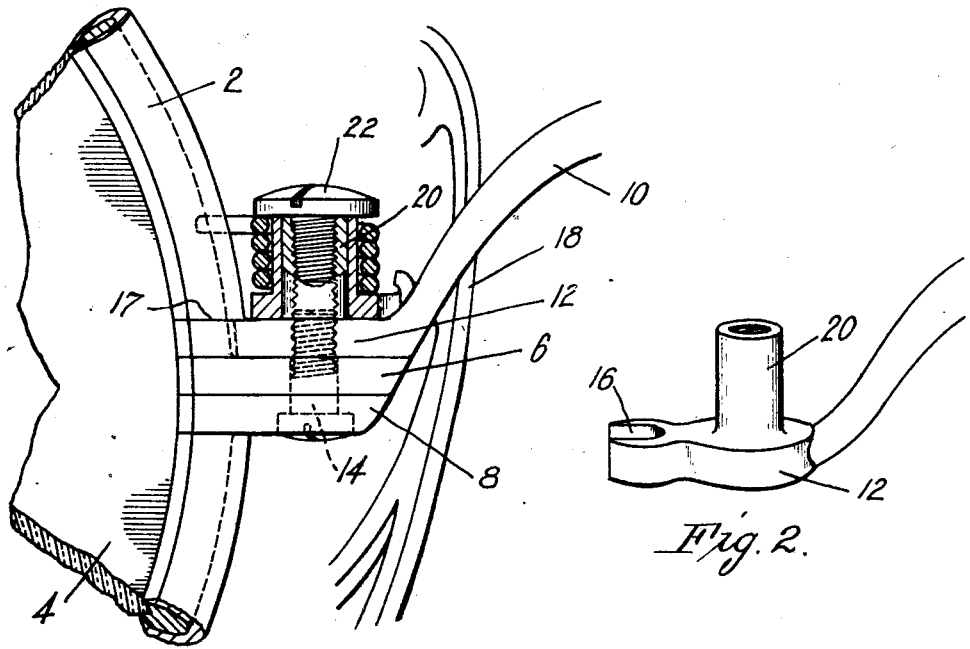
Figure 2:
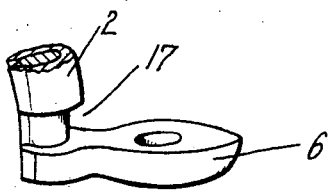
Figure 3:
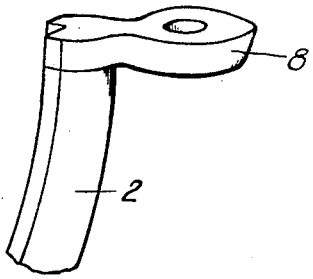

In the drawings, Fig. 1 is a fragmentary view of an eyeglass mounting constructed according to a preferred embodiment of the present invention; Fig. 2 is a detail view of a preferred bridge; and Fig. 3 is a view of the end pieces of the rim, with portions of the rim attached.

The invention is illustrated in the drawings as embodied in an eyeglass mounting comprising a split rim 2 for a lens 4. The split rim 2 is provided with superposed end pieces 6 and 8. The bridge 10 is provided with an end piece 12. According to the preferred embodiment illustrated, the bridge end piece 12 is superposed on the upper end piece 6 of the rim 2. The rim and the bridge are secured together at the end pieces by means of a screw or other post 14 that extends through openings in the three end pieces. The bridge 10 and the rim 2 are thus rendered readily separable and replaceable. The screw 14 should be coarse enough to withstand the shearing stresses brought to bear upon it without stripping the threads.

In order to prevent relative rotation of the bridge 10 and the rim 2, the bridge end piece 12 is provided with a terminal slot 16 adapted to receive the rim 2 and to interlock therewith. The rim 2 is illustrated as of the well-known, combination-metal-and-non-metallic type. As it is desirable to have the walls of the slot engage against the metal element of such a rim, the non-metallic element is shown cut away at 17, near the end piece 6. The slotted terminal portion 16 of the bridge end piece 12 is adapted to enter between the end piece 6 and the cut-away portion to lock against the metal element of the rim. The invention is not restricted to use with any particular type of rims, however, for all-metal rims, for example, may equally well be used. All that the optician needs to keep on hand is an assortment of rims of various styles, sizes and shapes, and a similar assortment of bridges, which he may connect together in any combination, to please any customer. The rims, furthermore, with end pieces attached, may be of the same type as are used in spectacles, thus further reducing the stock on hand that is necessary to be kept by the optician.

The customary spring-pressed, fingerpiece guard 18 is shown in Fig. 1 pivotally mounted about a tubular bearing 20 that is integrally provided upon the bridge end piece 12. The guard is maintained in position upon the bearing between the bridge end piece 12 and the head of a screw 22 that is tapped in the tubular bearing 20. Upon unscrewing the screw 14, therefore, the bridge 10 may be separated from the end pieces 6 and 8, carrying with it the guard 18 that is thus carried thereby. The guard 18 may, of course, be carried by the bridge end piece in some other manner than that shown, and may, in fact be integral therewith. The style, shape or size of rim may therefore be changed, without disturbing the guard, by merely manipulating the screw 14.

It is to be understood that all modifications that may be made within the spirit of the present invention by persons skilled in the art are intended to be included within the scope of appended claims.

What is claimed is:

1. An ophthalmic mounting having, in combination, a split lens rim having end pieces, a bridge having an end piece, a post extending through the three end pieces to secure the three end pieces together, a guard pivotally mounted about the post, and means for preventing rotation of the bridge end piece about the post.

2. An ophthalmic mounting having, in combination, a split lens rim having end pieces, a bridge having an end piece provided with a terminal slot within which the rim is received, and a post extending through the three end pieces to secure the three end pieces together, rotation of the bridge end piece about the post being prevented by the engagement of the rim with the walls of the slot.

3. An eyeglass mounting having, in combination, a split lens rim having superposed end pieces secured to the ends of the rim and projecting beyond the rim, a bridge extending substantially in line with the projecting end pieces and having an end piece superposed on the upper end piece of the rim, a guard carried by the bridge end piece, and means for securing the three end pieces together.

4. An eyeglass mounting having, in combination, a split lens rim having superposed end pieces secured to the ends of the rim and projecting beyond the rim, a bridge extending substantially in line with the projecting end pieces and having an end piece superposed on the upper end piece of the rim, the bridge end piece being provided with a guard bearing, a guard pivotally mounted about the bearing, means for securing the guard in position upon the bearing, and means extending through the three end pieces for securing the three end pieces together.

5. An eyeglass mounting having, in combination, a split lens rim having superposed end pieces, a bridge having an end piece superposed on the upper end piece of the rim and provided with a terminal slot within which the rim is received, the bridge end piece being provided with a guard bearing, a guard pivotally mounted about the bearing, and a post extending through the three end pieces to secure the three end pieces together, rotation of the bridge end piece about the post being prevented by the engagement of the rim with the walls of the slot.

6. An ophthalmic mounting having, in combination, a split lens rim having superposed end pieces secured to the ends of the rim and projecting beyond the rim, a bridge for connecting the rim with a second rim, the bridge having an end piece alined with the end pieces of the first-named rim, a guard pivotally mounted on the bridge end-piece, and means for rigidly securing the three end pieces together.

7. An eyeglass mounting having, in combination, a split lens rim having superposed end pieces secured to the ends of the rim and projecting beyond the rim, a bridge for connecting the rim with a second rim, the bridge having an end piece alined with the end pieces of the first-named rim, the bridge being provided with a guard bearing, a guard pivotally mounted about the bearing, and means for rigidly securing the rim, the bridge and the guard together at the end pieces.

In testimony whereof, I have hereunto subscribed my name this 16th day of March, 1923.

EUGENE CLAYTON BERNHEIM.